United States Patent Office 3,770,810
Patented Nov. 6, 1973

3,770,810
LIQUID HALO-VINYLIC COPOLYMERS HAVING HYDROXYL FUNCTIONALITY
Dale D. Dixon, Kutztown, Pa., assignor to Air Products and Chemicals, Inc., Wayne, Pa.
No Drawing. Filed Oct. 28, 1971, Ser. No. 193,535
Int. Cl. C07c 69/54
U.S. Cl. 260—486 R                    5 Claims

ABSTRACT OF THE DISCLOSURE

Normally liquid vinylic copolymers having pendent hydroxyl functionality are obtained by copolymerizing a major amount of vinyl chloride monomer and a minor amount of polymerizable, functional group terminated vinylic unsaturated monomer in the presence of an effective amount of $C_1$ to $C_3$ bromohaloalkane in the absence of catalyst. The bromohaloalkane acts as chain transfer agent and is employed in an amount of 5 to 40% by weight based on the combined weight of the monomers. Such copolymers have utility in a wide range as intermediates through the hydroxyl functionality and halogen content, such as for example, as all or part of the polyol in formulations for fire retardant polyurethanes.

BACKGROUND OF THE INVENTION

(1) Field of the invention

This invention is concerned with halopolymers having hydroxyl functionality. Such polyol-type materials have a liquidity and a stability resistant to degradation by heat and light effects unique to low molecular weight polyvinylchloride polymers.

(2) Description of the prior art

Polymers predominating in vinyl chloride precursor are numerous in type and utility. In general, however, such polymers are long chain and/or high molecular weight materials considered as per se products and not as customary intermediates. Little has been reported of attempts to obtain low molecular weight, fluid vinyl chloride polymers. Apparently such efforts have been unsatisfactory because of difficulties in reproducibility, formation of low molecular weight solids, and because of a high degree of instability of the product. Not only have such low molecular weight vinyl chloride polymers been susceptible to endogenous degradation but they have been readily decomposed by light and at very moderate elevated temperatures.

The art is sparse in the area of normally liquid vinyl chloride-type polymers. French Pat. No. 2,005,255 presents a method of preparing viscous chlorinated cotelomers based on vinyl chloride, a second monomer and either chloroform or carbon tetrachloride with polymerization effected in the presence of an iron compound as catalyst. Such telomers are suggested as plasticizing agents acting similarly to chlorinated paraffins. While telomerization of vinyl chloride with carbon tetrachloride is well known, the French patent with its binary or ternary monomeric precursors and the iron-type catalysis brings some further degree of product control over the previously known telomerization.

While the French patent provides a product having more desirable attributes than obtained by ordinary telomerization and such product has its own area of utility, it does not provide for preparation of materials having certain desirable characteristics of the vinyl chloride combined with built-in functionality enabling use thereof as a valuable intermediate.

SUMMARY OF THE INVENTION

In accordance with this invention normally liquid polyols having a high halogen content are obtained by the copolymerization of a major amount in the range of 51 to 94% by weight of vinyl chloride monomer and a minor amount in the order of 49 to 6% by weight of an hydroxylated vinylic unsaturated monomer in the presence of a $C_1$ to $C_3$ bromohaloalkane as chain transfer agent and in the absence of catalyst. Polymerization may be and preferably is effected in a solvent system. The conditions employed for the polymerization reaction include autogenous pressure in a closed system with temperatures in the range of 35° to 75° C. for a time in the range of about 2 to 24 hours.

While one of the monomers of the polymerization precursor system is described as vinyl chloride, it is to be understood that such monomer may be any of the vinyl halides and that of such vinyl halides the monomeric material selected therefrom may be a single halide, e.g., vinyl chloride, or a mixture of two or more such vinyl halides. Vinyl chloride is preferred for several reasons including ready availability, general familiarity and acceptance to the industry, and economic favorability. For such reasons the description is with vinyl chloride without however being limited thereto.

The hydroxylated vinylic unsaturated monomer is selected such that the copolymeric product of the vinyl chloride and the hydroxylated monomer has an hydroxyl number equivalent to an hydroxyl functionality of at least 1 per chain molecule. Such monomers particularly effective are hydroxyethyl esters of acrylic acid and methacrylic acid which may be employed in any combination although a single ester type is preferred.

The chain transfer agent, employed in an amount in the range of 5 to 40% by weight of the weight of the combined weight of the monomers, has been defined as any one or combination of $C_1$ to $C_3$ bromohaloalkanes. Such bromohaloalkanes are unique in that they alone are effective in producing the chain transfer and chain capping effect peculiar to this invention. The usual chain transfer agents, including carbon tetrachloride, trichloroethylene, and even bromoform are unsatisfactory in that they do not function to provide the functional liquid products of the present system. Such unsatisfactory chain transfer agents still are quite suitable as solvents in the system.

The solvent material is characterized mainly in its ability to hold in solution the polymeric system in its precursor form, during polymerization and after termination of the polymerization reaction. Ready removability is likewise a requirement. The amount of solvent employed has a lower limit imposed simply on the ability to effect and maintain the required solvency and an upper limit of practicality as to volume and dilution effect; such as for example in the range of 2 to 5 parts by weight per unit of the combined weight of the monomers. Typical solvents include tetrahydrofuran, methylene chloride, chloroform, carbon tetrachloride, trichloroethylene, or the like.

Polymerization conditions are consistent with the customary practice with consideration of the reactivity of the monomers and the desired product. A closed system is employed. The precursors may be combined at conditions such that any particular reaction rate is substantially nil such as at a temperature below about $-10°$ C. The polymerization reaction is effected at modestly elevated temperature such as in the range of about 35 to 75° C. and for a time generally in the range of 4 to 24 hours. In accordance with typical polymerization reactions the use of a polymerization initiator is inherent. Known initiators may be employed such as the peroxide type, e.g., benzoyl peroxide, or other, such as azo-bisisobutyronitrile. Such free radical initiators should be effective at the defined reaction conditions and when employed in relatively small amount, such as 1 part by weight or less per 100 parts by weight of the combined weight of the monomers.

DETAILED DESCRIPTION

The key features of the invention are the pourable liquid nature of the described copolymers and their unexpected stability toward light and heat.

Vinyl chloride readily polymerizes and copolymerizes to high molecular weight solids and it is a formidable task to limit the chain length such that a liquid product is formed Preparation of the described copolymers requires bromohaloalkane such as carbon tetrabromide or bromotrichloromethane as chain, transfer agent. Pourable liquids cannot be obtained when more conventional chain transfer agents such as carbon tetrachloride, trichloroethylene, or bromoform are used.

Example I

Homopolymerization of vinyl chloride in the presence of a sufficient quantity of carbon tetrabromide or bromotrichloromethane provides pourable liquids which are highly unstable to light and heat. It has been found that the stability of the herein described copolymers is dependent on the amount of acrylate comonomer incorporated in the final product. Incorporation of small precentages of β-hydroxyethylacrylate in the copolymer provides large increases in light and heat stability. The product is a pourable liquid copolymer of β-hydroxyethylacrylate and vinyl chloride in the molecular weight range of 400 to 5000. The described copolymers are prepared by heating a solution of β-hydroxyethylacrylate, vinyl chloride, azo initiator, solvent (tetrahydrofuran, methylene chloride, chloroform, carbon tetrachloride, or trichloroethylene) and chain transfer agent (carbon tetrabromide). The operative proportions of monomers are:

(A) Monomers:
  Vinyl chloride _____ 51–94%.
  β-Hydroxyethylacrylate _____ 49–6%.
(B) Chain transfer agent:
  Carbon tetrabromide _____ 5%–40% of A.

The preferred range of proportions is dependent upon the desired functionality, halogen content and viscosity of the end product.

The amount of solvent to be used depends upon the type of solvent with the preferred range being approximately 2 to 5 parts by weight of solvent per part by weight of combined weight of the monomers.

Table 1 illustrates the effect of monomer ratios upon the functionality (OH groups per molecules), the molecular weight and viscosity.

TABLE 1

| Ratio of monomers | | | OH groups molecule | Mol wt. | Viscosity |
|---|---|---|---|---|---|
| HEA | VCl | CBr₄ | | | |
| 13% | 57% | 30% | 0.8 | 1,260 | 28 cps. |
| 15% | 67% | 18% | 3.0 | 3,080 | 40,000 cps. |
| 17% | 73% | 10% | 5.9 | 3,710 | Very viscous. |

Example II

To a one quart bottle was charged 400 ml. of tetrahydrofuran, 26.8 g. (0.23 mole) of β-hydroxyethylacrylate and 63.6 g. (0.19 mole) of carbontetrabromide. The bottle was sealed and cooled at −18° C. for several hours, then azobisisobutyronitrile, 1.0 g., and 120 g. (1.92 moles) of vinyl chloride were added. The bottle was again sealed and placed in a rotary bath at 60° C. for twenty hours. The contents of the bottle were poured into a round bottom flask and the solvent removed at 40° C. on a rotary evaporator first at aspirator pressure and then 0.1 mm. of mercury. Yield of pourable oil was 120 g. Analysis of the oil showed it to have a hydroxyl number of 37 and a molecular weight of 1260.

Example III

To a one quart bottle was charged 400 ml. of tetrahydrofuran, 26.8 g. (0.23 mole) of β-hydroxyethylacrylate and 32.0 g. (0.09 mole) of carbontetrabromide. The mixture was sealed, cooled to −18° C. and 1.0 g. of azobisisobutyronitrile and 120.0 g. (1.92 moles) of vinyl chloride were added. The bottle was resealed and placed in a rotary bath at 60° C. for twenty hours. The solvent was removed at 40° C. in vacuo first at aspirator pressure and then 0.1 mm. of mercury. Yield of pourable oil was 115 g. Analysis of the oil gave a hydroxyl number of 60 and a molecular weight of 3080.

Example IV

To a one quart bottle was charged 400 ml. of tetrahydrofuran, 26.8 g. (0.23 mole) of β-hydroxyethyl acrylate and 16.0 g. (0.05 mole) of carbontetrabromide. The mixture was sealed, cooled to −18° C. then 1.0 g. of azobisisobutyronitrile and 120 g. (1.92 moles) of vinyl chloride were added. The bottle was resealed and placed in a rotary bath at 60° C. for twenty hours. The solvent was removed at 40° C. in vacuo first at aspirator pressure and then at 0.1 mm. of mercury. Yield of viscous oil was 77.5 g. Analysis of the oil gave a hydroxyl number of 88 and a molecular weight of 3701.

Example V

The described polyols have been used as reactive additives to impart flame retardancy to rigid polyurethane foams. For example, the oxygen index test has been used to determine the flame retardant effect of a polyol, substantially similar to the product from Example III, of molecular weight 2980 and hydroxyl number of 57. (The oxygen index is a measure of the percentage of oxygen required in the chamber to maintain combustion of the polyurethane sample.) The oxygen index increased as the level of chlorine increased in the foams.

A rigid polyurethane foam of 2 pounds per cubic foot density was prepared using a sorbitol based polyol and Mondur MRS as the polyisocyanate. The above-described flame retardant polyol was added to the foams to give approximately 5, 10, 15 and 20% bound halogen. The results of the oxygen index test are shown in Table 2.

TABLE 2

| Polyurethane foams: | Oxygen index |
|---|---|
| Control | 0.20 |
| Control+5% halogen | 0.26 |
| Control+10% halogen | 0.27 |
| Control+15% halogen | 0.27 |
| Control+20% halogen | 0.28 |

Example V

The previously described polyols react with polyisocyanates to form polyurethane coatings without requirement of a solvent medium. Following the general procedure of Example III, a weight ratio of 4 to 1 vinyl chloride:β-hydroxyethylacrylate was polymerized in the presence of 25 weight percent CBr₄. The recovered bromine-capped polyol had a molecular weight of 4520 and hydroxyl number of 158.

Toluene diisocyanate, 8.8 g. (0.05 mole) and the polyol, 31.6 g. (0.007 mole), were thoroughly mixed at room temperature. The oil mixture was spread as a film on a glass plate and cured at 110° C. for twenty minutes. The cured product was a clear hard film.

Example VI

Heat stability for those polymers was found to increase with greater β-HEA content in the liquid polymers. This stability (in terms of HCl generation) was measured as a function of β-HEA-VCl functionality. At approximately the same molecular weights, the degree of HCl evolved was inversely related to the hydroxyl functionality (β-HEA content).

Approximately 20 g. of β-HEA-VCl copolymer sample was weighed into a 1 in. O.D. x 6 in. test tube. The tube was then sealed with a rubber stopper equipped with a gas inlet and outlet. The outlet was submerged into a beaker containing 7.08 M NaOH in 100 ml. of $H_2O$. The test tubes with the samples were then heated in an oil bath while maintaining a $N_2$ flow. The temperature was raised to 107° C. and maintained there for 30 min.

The NaOH solutions were then titrated potentiometrically with 0.5 N HCl to determine the unneutralized caustic.

| Sample: | OH functionality | Molecular weight | Total acidity, mM. HCl/g. g. sample |
|---|---|---|---|
| 1 | 1.2 | 2,600 | $1.59 \times 10^{-1}$ |
| 2 | 2.0 | 2,600 | $5.73 \times 10^{-2}$ |
| 3 | 5.1 | 2,800 | $3.86 \times 10^{-2}$ |

The data show considerable stability of the products against heat degradation as well as the inverse relationship of stability to hydroxyl functionality.

Example VII

Samples prepared in a similar manner and in like amounts as in Example VI are exposed to ultraviolet light at elevated temperature (approximately 95° C.) in a modified artificial weathering environment. The samples, in test tube arrangement similar to that of the temperature stability test of Example VI, are swept with nitrogen gas for 2 hours. The nitrogen gas is bubbled through the standard caustic solution which is subsequently titrated to determine the relative HCl release from the samples. Surprisingly, the total acidity as indicative of halogen release is less than 10% greater for the respectively similar samples to those of Example VI even though time and ultraviolet light are added factors.

In other programs on preparation of these polyols, results demonstrate that the best fire retardant-type polyols are obtained when the vinyl halide monomer is present in excess to the hydroxylated monomer. It is also found that less than the indicated amount or more than the indicated amount of the brominated chain transfer agent gives considerably poorer and unacceptable results in yield and/or type of product.

Obviously, many modifications and variations of the invention as hereinbefore set forth may be made without departing from the spirit and scope thereof, and therefore only such limitations should be imposed as are indicated in the appended claims.

I claim:

1. The method of preparing normally liquid, vinylic copolymers comprising vinyl chloride and having pendent hydroxyl functionality, said method comprising copolymerizing a major amount in the range of 51% to 95% of vinyl chloride monomer and a minor amount in the range of 6% to 49% of an hydroxylated vinylic unsaturated monomer, selected from the group consisting of hydroxyethyl acrylate and hydroxyethyl methacrylate the percent being by weight percent of the combined weight of the monomers, said copolymerizing being effected in the presence of a $C_1$ to $C_3$ bromohaloalkane chain transfer agent present in an amount in the range of 5% to 40% by weight of the combined weight of the monomers, said copolymerizing being effected in a closed system at conditions including a temperature in the range of 35° to 75° C., a time in the range of 4 to 24 hours and at autogenous pressure.

2. The method of claim 1 characterized in that said copolymerization is effected in a solvent.

3. The method of claim 2 wherein said solvent is employed in an amount in the range of 2 to 5 times the weight of the monomers and the chain transfer agent.

4. A normally liquid polyol having a molecular weight in the range of 400 to 5000, characterized in having at least one pendent hydroxyl per molecule, said polyol being a highly halogenated copolymer with a terminal bromine atom per molecule, wherein said copolymer is the polymerizate of a major amount of vinyl halide monomer and a minor amount of hydroxylated vinylic unsaturated monomer selected from the group consisting of hydroxyethyl acrylate and hydroxyethyl methacrylate having an hydroxyl number equivalent to an hydroxyl functionality of at least 1 per chain molecule of said copolymer, said copolymer being end capped with said terminal bromine atom per molecule of copolymer, said bromine atom deriving from a $C_1$ to $C_3$ bromohaloalkane chain transfer and end capping agent present with said monomers.

5. A polyol in accordance with claim 4 wherein said copolymer is the polymerizate of a major amount of vinyl chloride and a minor amount of β-hydroxyethylacrylate polymerized in the presence of bromohaloalkane chain transfer agent.

References Cited
UNITED STATES PATENTS
2,918,493  12/1959  Panzer et al. _____ 260—486 R LORRAINE A. WEINBERGER, Primary Examiner
P. J. KILLOS, Assistant Examiner U.S. Cl. X.R.
117—136; 260—86.3